United States Patent

[11] 3,583,714

| [72] | Inventors | Gene P. Weltzer<br>Henrietta;<br>Edwin C. Jaehn, Rochester, both of, N.Y. |
|------|-----------|---|
| [21] | Appl. No. | 779,481 |
| [22] | Filed | Nov. 27, 1968 |
| [45] | Patented | June 8, 1971 |
| [73] | Assignee | The Gleason Works<br>Rochester, N.Y. |

[54] CHUCK AND COLLET FOR SHANK PINIONS AND THE LIKE
8 Claims, 7 Drawing Figs.

[52] U.S. Cl. ................................................ 279/51,
279/1
[51] Int. Cl. ............................................... B23b 31/20
[50] Field of Search.......................................... 279/1 DA,
1 DC, 1 L, 43, 50, 51, 44, 45, 46, 47, 48, 49, 52,
53, 95, 96; 226/165

[56] References Cited
UNITED STATES PATENTS

| 2,583,831 | 1/1952 | Goergen.................... | 279/49 |
| 2,935,329 | 5/1960 | Hessler..................... | 279/2 |
| 2,755,094 | 7/1956 | Benjamin.................. | 279/51 |
| 3,488,850 | 1/1970 | Lieb.......................... | 279/51X |

FOREIGN PATENTS

| 568,005 | 1924 | France .................... | |

*Primary Examiner*—Andrew R. Juhasz
*Assistant Examiner*—Donald D. Evenson
*Attorneys*—Cushman, Darby and Cushman and Morton A. Polster ABSTRACT: A collet is provided with axially spaced work-gripping surfaces which operate independently of each other to effect precise alignment of a workpiece relative to a work spindle. The collet is of a unitary construction and is slidably arranged in a tubular chuck body.

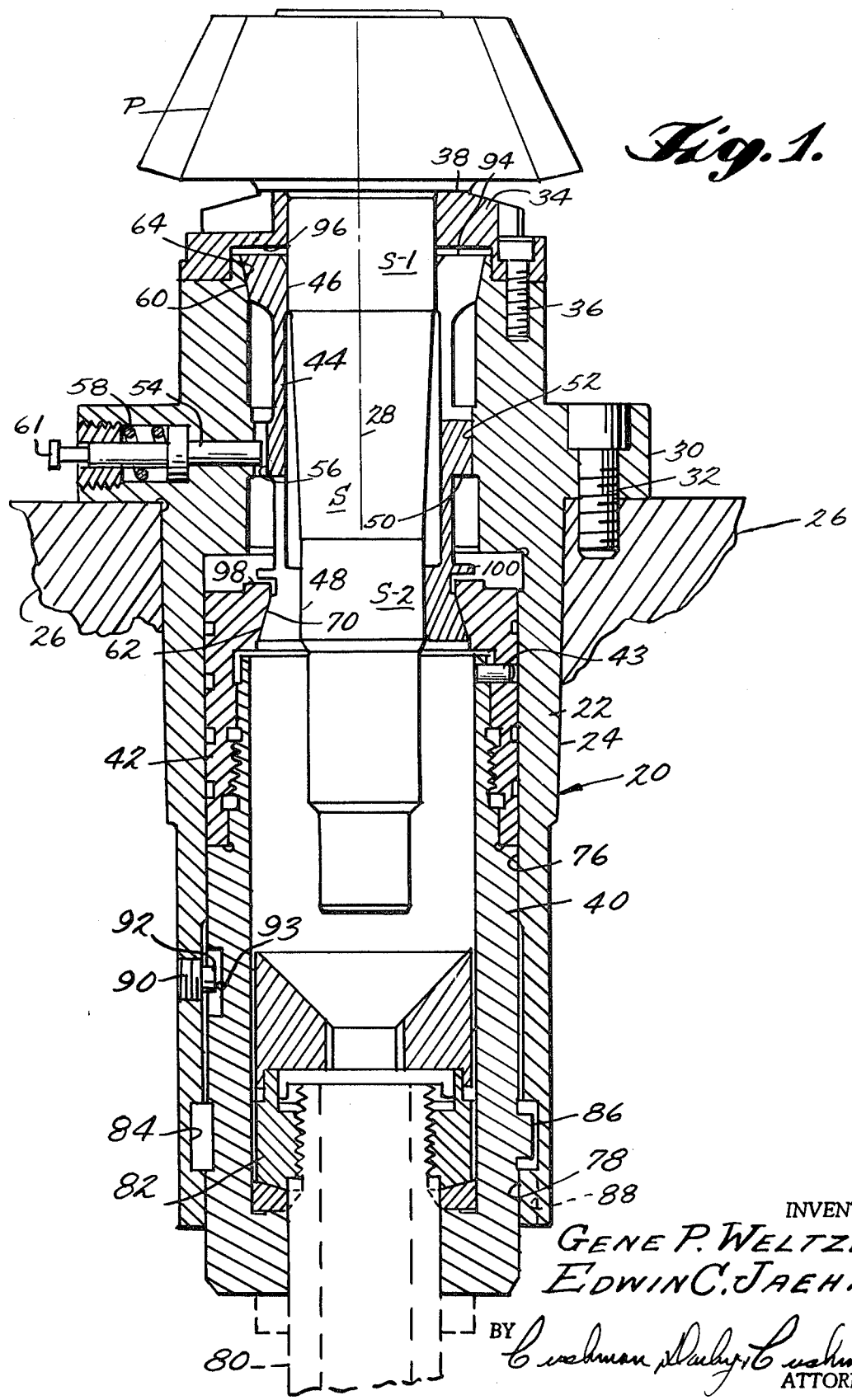

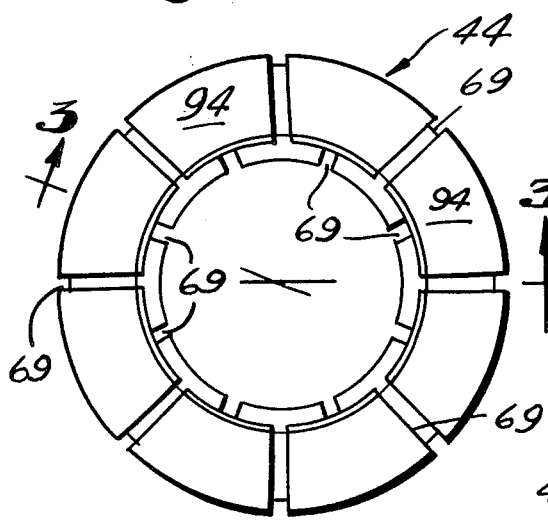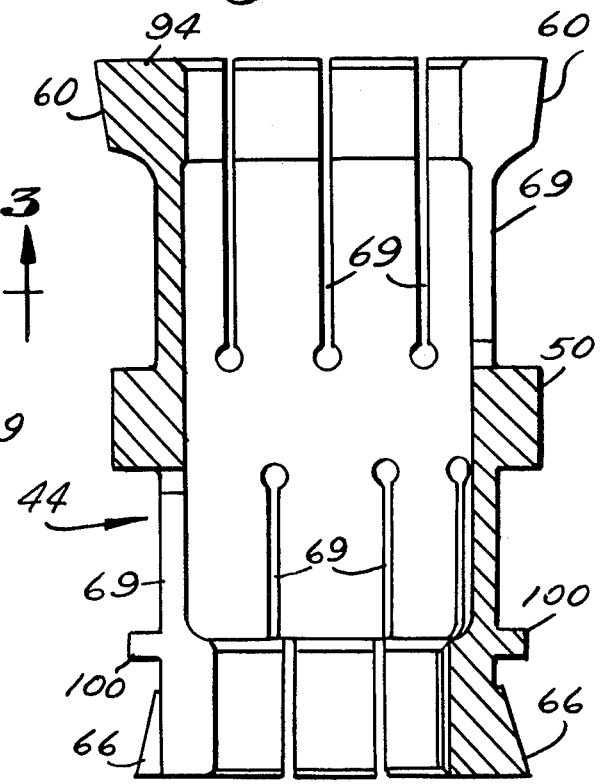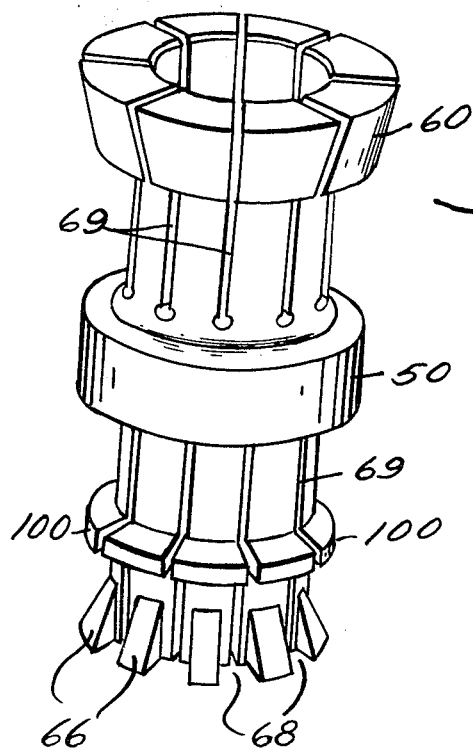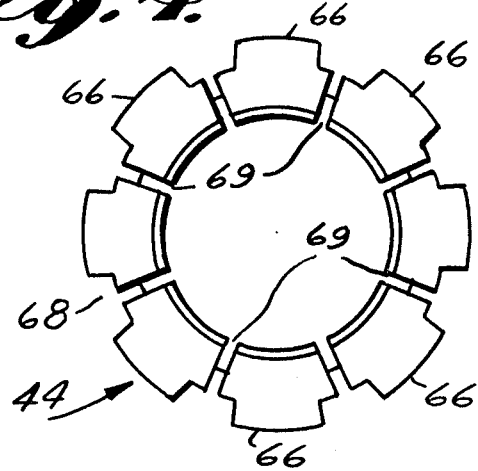
INVENTORS
GENE P. WELTZER
EDWIN C. JAEHN
BY Cushman, Darby & Cushman
ATTORNEYS INVENTORS
GENE P. WELTZER
EDWIN C. JAEHN
BY Cushman, Darby & Cushman
ATTORNEYS

CHUCK AND COLLET FOR SHANK PINIONS AND THE LIKE

The present invention relates to workholders of the type including a chuck and a collet, and more particularly it relates to workholders including a chuck and a work-gripping collet that is radially expandible and contractable upon axial motion imparted to it by a chuck actuator, and especially designed to grip shank pinions and the like in connection with the manufacture of gears.

While the present development relates especially to the production of bevel pinion gears for the automotive industry, for example, spiral bevel or hypoid gears, it will be apparent to those skilled in the art that features of the development may be used in machines for making other types of gears, and for industries other than the automotive industry.

Some previously designed chuck and collet constructions of the type under consideration are disclosed and claimed in United States Patents, such as the patent to Hessler, No. 2,935,329, granted May 3, 1960, and the Pat. No. 3,244,427 to Taschl, granted Apr. 5, 1966. These patents disclose collet constructions adapted to grip shank pinions at axially spaced regions by means of camming actions effected through tapered, cam surfaces on the collect and chuck. The present invention constitutes an improvement thereover for the purpose intended, as will be evident.

An important object of the present invention is to provide a novel chuck and collet construction especially adapted for use in connection with gear cutting machines of the type wherein the shank pinions will be automatically loaded and unloaded in the work spindle. One of the problems in connection with automatic loading and unloading of shank pinions is maintaining concentricity between the axis of rotation of the work spindle and the axis of rotation of the shank pinion, so as to produce gear teeth of desired size and configuration, and on workpieces varying in size, as is understood. Thus, a further object of the present invention is to provide the collet and chuck construction with novel means for more effectively assuring proper concentricity in the mounting of the shank pinion in the work spindle and further being of such design as to accommodate a relatively wide range of sizes of work pieces.

Misalignment of the workpiece in the work spindle might occur in work holding devices of the type under consideration if the collet is not properly centered in the chuck after a dechucking operation so that when the next workpiece is received in the collet, the latter may not be locked up in the chucked position in proper alignment with the workpiece concentric with the work spindle. A more specific object of the present invention, therefore, is to provide a novel centering means on the chuck and collet, which in the illustrative embodiment of the invention includes in the illustrative embodiment of the invention includes an external annular ring mounted for axially slidable motion in the chuck and preferably in close fitting relation therewith to retain the collet structure in accurately located concentricity with the work spindle at all times. That is, this centering means is effective even when the collet is in its open, dechucked, position, thereby preventing damage to workpiece shanks and undesirable wear to the collet that might otherwise result if the collet were not maintained in very accurate alignment when receiving an automatically-loaded workpiece.

Collets of the type disclosed in the patents referred to above are provided with two axially spaced work-gripping surfaces, so that the shank of the workpiece may be held at two separate, axially spaced, regions. This is desirable and advantageous, as is understood. However, it is also desirable, in connection with effecting proper alignment of the workpiece, that these two axially spaced work-gripping means on the collet operate independently of each other; as will be evident as the description proceeds. Thus, a further object of the invention is to provide a novel collet construction wherein the workpiece will be gripped at two axially spaced regions with the gripping action at one region being independent from the gripping action at the other region. In the illustrating embodiment of the invention, this is effected through the provision of cam surfaces at either end of the collet, with axially extending slots provided at each end of the collet, and extending roughly to some intermediate point so that the slots at one end of the collet do not extend into the area defined by the slots at the other end. Thus, when there is a radial compression of one end of the collet for gripping the work at that end, the compressing action at that end of the collet will not be transmitted to or felt by the other end of the collet. This more readily accommodates the tolerance range on the shank diameters at the two gripping regions.

It is a still further object of the present invention to provide a novel collet and chuck construction, of the type under consideration, wherein the collet is a single, unitary, tubular member, and wherein means are provided to facilitate convenient assembly and disassembly of the collet into or out of operative engagement with the chuck.

Yet another object of the present invention is to provide novel and simplified collet and chuck constructions, especially adapted to be utilized in the manufacture of gears, for example, in cutting, testing lapping or other operations.

The novel features of the invention may best be made clear from the following description and accompanying drawings in which:

FIG. 1 is an axial sectional view through the chuck and collet embodying the invention and illustrating a workpiece in its gripped position;

FIG. 2 is an enlarged plan view of the forward end of the collet shown in FIG. 1;

FIG. 3 is a sectional view taken along the line 3–3 of FIG. 2;

FIG. 4 is a bottom view of the collet of FIG. 2;

FIG. 5 is a perspective view of the collet of FIG. 3 and on a somewhat reduced scale;

Figure 6:
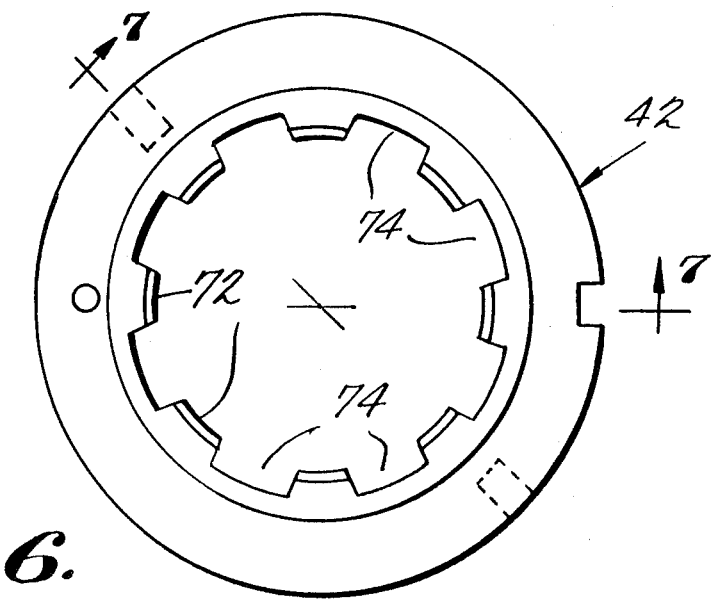
FIG. 6 is an enlarged plan view of the contractor shown in FIG. 1.

The illustrative embodiment of the invention as shown in the drawings will now be described in greater detail. As best seen in FIG. 1, the chuck 20 comprises a tubular body whose main section 22 includes a slightly tapered outer surface 24 seated with a draw fit in a similarly tapered bore of the work spindle 26 of a pinion gear cutting, testing or lapping machine. As previously indicated, the present invention was especially designed for use in the recent development of The Gleason Works, referred to above, wherein the axis of rotation of the work spindle 26, designated by the numeral 28 will be vertical or generally vertical. This axis 28 will also be the longitudinal axis of the chuck body, as will be evident. It will be understood, however, that the collet and chuck of the present invention may be utilized in machines wherein the work is arranged for rotation about a horizontal or generally horizontal axis, or an axis of some other orientation, if desired.

A flange 30 is provided on the chuck body section and seats on the adjacent end face of the work spindle 26, being secured thereto as by screws 32. Jack screws (not shown) may be threaded in the flange 30 for the purpose of drawing the chuck from the spindle, when desired, as disclosed in the Taschl patent, mentioned above.

The chuck body is shown as including a front piece 34 secured by several screws 36 to the forward end of the chuck 20. The front surface 38 of the front piece 34 seats the back or underface of the head of the bevel pinion P, and the shank S of the pinion extends through a pilot opening in the front piece and into the chuck interior, as shown. An air readout line (not shown) may be provided leading through the flange 30 of the chuck and into the front piece 34, opening at the front surface 38, for the purpose of giving a signal that the workpiece has been firmly and properly positioned, so that the cutting operation may begin, as disclosed in the copending application Ser. No. 624,286, filed Mar. 20, 1967, now Pat. No. 3,456,953.

Disposed inside the tubular body of the chuck 20 is the tubular chuck actuator 40 having a contractor 42 secured thereto at the forward end thereof, as by the threaded connection and dowel pin 43, shown. The collet 44 is shown as being arranged inside the tubular body of the chuck 20 forwardly of the tubular actuator 40 and in operative, releasable engagement with the contractor 42, as will be described in more detail hereinbelow.

As best seen in FIGS. 1—5, the collet 44 preferably is metallic and of single, unitary construction provided with internal concave cylindrical surfaces 46, 48, adjacent either end thereof and substantially complementary to and adapted to grip axially spaced cylindrical surfaces S–1 and S–2 of the pinion shank. An annular centering ring 50 is arranged exteriorly of the collet and is designed to slide on an internal annular boss 52 provided in the bore of the chuck 20, as shown in FIG. 1. In an exemplary embodiment of the invention, there will be a relatively close fit between this ring 50 and the boss 52 which, while permitting axial slidable motion of the collet 44 in the chuck 20, will be sufficiently close so as to prevent wobbling or misalignment of the collet in the chuck. Thus, the collet 44 will be desirably held at all times with its own axis of rotation concentric with the axis of rotation of the work spindle 26.

A retractable locking pin 54 is shown slidably arranged in the flange 30 on the chuck 20, and extending partially into a slot 56 provided in the centering ring 50. This pin 54 is shown as being urged by spring 58 into slot 56 so as to prevent rotation of the collet 44 relative to the chuck 20, as will be evident, and another one of these locking pins may be provided, if desired, at some other location on the flange 30 for engagement in a slot formed in the centering ring 50 corresponding to the slot 56. The pin 54 may be withdrawn by pulling the head 61 thereof outwardly in connection with assembly and disassembly of the collet in the chuck, as will be evident.

Adjacent the work-gripping surfaces 46, 48 of the collet and disposed radially outwardly thereof are cam surfaces 60, 62 respectively, as best seen in FIGS. 1—5. The forward cam surface 60 is shown as being conical with its cone axis substantially coincident with the axis 28. It will be understood that, if desired, this cam surface 60 may be formed of a plurality of flat, plane faces. The cam surface 60 is shown as tapering rearwardly and inwardly, and a complementarily tapered surface 64 is provided at the mouth or forward end of the chuck 20 for cooperation therewith, as will be evident.

The cam surface 62 at the rearward end of the collet 44, as best seen in FIGS. 1 and 3—5 is defined by a plurality of separate and circumferentially aligned projections 66. These projections are shown as being of the same size and shape, each having a tapering face, and all the faces combining to define the conical, cam surface 62 tapering inwardly and forwardly, as best seen in FIG. 5. The recesses 68 between the projections 66 are designed to cooperate with complimentary structure on the contractor 42 to facilitate assembly and disassembly of the collet 44, as will become apparent. It will be noted that the outer radial extremity of the cam surface defined by the projections 66 lies radially inwardly of the external cylindrical surface of the centering ring 50, while this latter surface, in turn, lies radially inwardly of the cam surface 60 at the forward end of the collet. This particular dimensional relationship of these parts will facilitate assembly and disassembly of the unitary collet, as will be understood.

The collet 44 is shown as being provided with two sets of axially extending slots 69 therein, as best seen in FIGS. 2—5. The forward set of slots 69 extends from the forward end of the collet to points adjacent the centering ring 50 and the rearward set of slots 69 extend from the rear end of the collet to points adjacent the centering ring 50, as illustrated. The forward and rearward slots 69 are staggered, as shown, and they provide for the radial compression and expansion of the work-gripping surfaces 46, 48 during chucking and dechucking operations, as will be evident. If desired, some suitable resilient and elastic material, such as rubber, may be provided in these slots.

Figure 7:
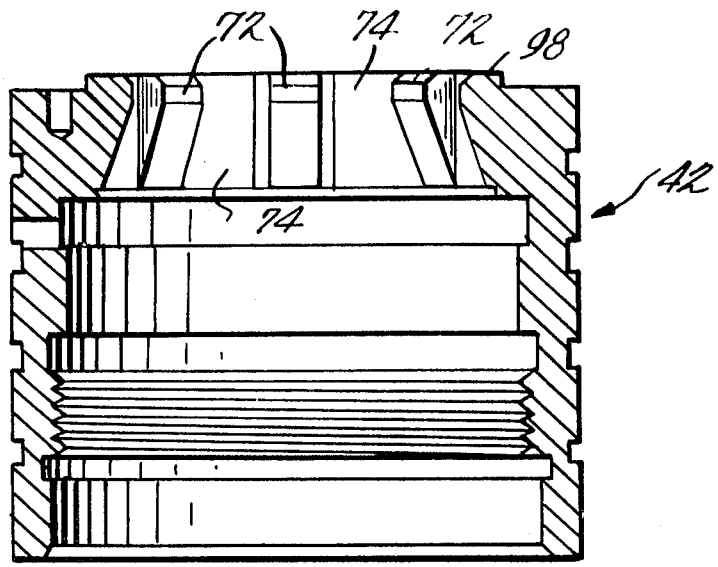
FIG. 7 is a sectional view taken along the line 7–7 of FIG. 6.

The contractor 42, as best seen in FIGS. 1, 6 and 7 includes a cam surface 70 complimentary to the cam surface 62 at the rear of the collet. This cam surface 70 is defined by a plurality of separate and circumferentially aligned inward projections 72 shown as being of the same size and shape, each having a tapering face and all the faces combining to define the conical, cam surface 70. The recesses 74 between projections 70 are shown as being of a size and arrangement to receive the projections 66 at the rear of the collet 44 to provide a bayonet-type connection. Thus, when inserting the collet into the chuck, the projections 66 on the collet will be axially moved into the recesses 74 on the contractor and the collet will then be rotated to bring the mating conical surfaces 62, 70 of the collet and contractor, respectively, into engagement. During this time, the locking pin 54 will be withdrawn and after the collet has been mounted into operative position in the contractor, the pin will be released to move into the slot 56 of the centering ring 50 and lock the collet against any rotation relative to the chuck 20 or contractor 42, as might release the bayonet connection.

The tubular chuck actuator 40 is shown as being slidable axially of the chuck 20 on internal cylindrical surfaces 76, 78, as best seen in FIG. 1. The contractor 42 is also axially slidably on the surface 76, as will be evident. The axis motion of the actuator 40 will be effected by suitable means, such as a piston (not shown), as will be understood. Suitable means are provided for connecting this piston and the actuator 40 to a tubular draw rod 80. As best seen in FIG. 1, this structure includes a nut 82 carried inside the actuator 40 and in threaded engagement to the forward end of the draw rod 80.

An internal annular recess 84 is shown as being provided in the chuck body 20 adjacent the rear end thereof, and a projection 86 is arranged on the chuck actuator 40 for disposition in this recess, as by insertion through an axial slot 88 arranged at the rear end of the chuck body and opening into the recess 84. Thus, in mounting the chuck actuator 40 in the chuck, the former will be axially inserted into the rear of the latter with the projection 86 of the actuator moving through the slot 88 on the chuck body until it is disposed within the recess 84. At this time, the actuator may be rotated, and suitable means may be provided for locking it against rotation relative to the chuck body 20. Such means is shown in FIG. 1 as including a screw 90 having an inner projection 92 adapted to be disposed within a suitable recess or notch 93 in the chuck actuator 40, as indicated.

The purpose of the projection 86 and recess 84 is to provide a limit for the rearward travel of the actuator 40 in the event of applied hydraulic chucking pressure with no workpiece in the collet.

Referring to the collet 44, the cam surface 62 at the rear thereof is shown as being of greater cone angle than the cam surface 60 at the forward end of the collet. In an exemplary embodiment of the invention, it is contemplated that the inclination of cam surfaces 62, 70 is approximately 15°, a nonlocking angle, while that of the forward cam surfaces 60, 64 is a locking or near locking angle of about 7°. However, it will be understood that the inclination of these cam surfaces 60, 64 may be inclined at a greater angle than the rear cam surfaces 62, 70, if desired.

The front face 94 of the collet is designed to abut or substantially abut the shoulder 96 of the front piece 34, when the collet is in a work-receiving position, and the front face 98 of the contractor 42 is designed to abut an annular collar 100 on the collet 44, during dechucking operations.

Chucking of a pinion P is effected by inserting the pinion shank in the position shown in FIG. 1 while the actuator 40 is in its forward limit position, which will be upward of the position thereof shown in FIG. 1, and the collet 44 will be held in its forward limit position wherein the front surface 94 thereof abuts, or substantially abuts, the shoulder 96 of the front piece. The piston will then be operated to draw the actuator 40 and contractor 42 rearwardly, resulting in contact of rear surface 62 and 70. During further rearward motion of actuator and contractor, collet 44 will be drawn rearward, and the forward cam surface 60 of the collet will be contracted radially inwardly by cam action from the surface 64 on the chuck, causing surface 46 to grip section S-1 of the shank. As forward cam surface 60 begins to contract, so also will rear cam surface 62, until the latter has caused surface 48 to grip section S-2. Normally gripping action will start on S-1 surface followed by that on S-2 surface. Rearward movement of the collet while gripping the pinion will draw the pinion head firmly against seat 38. The rearward pressure finally exerted by the piston against the actuator and the collet acts by camming of the surfaces 60, 64 and 62, 70 to hold the collet firmly clamped to the chuck body and to the pinion shank. When the rear cam surface 62 is being contracted around the shank section S-2, this radial contraction of the rear section of the collet will not be transmitted beyond the center ring 50, since the rear set of slots 69 terminates before that ring. Likewise, the gripping action effected through the front or forward cam surface 60 will involve a radial contraction of the front section of the collet that will not be transmitted beyond the centering ring since the front set of slots 69 terminates short of the centering ring and they are in staggered relation with the rear set of slots.

After the workpiece has been cut, it will be unclamped by a forward motion of the actuator 40. At the beginning of this forward motion, there may be some slight movement of the contractor 42 with the collet 44 but due to the larger angle of inclination of the rear cam surface 62 in the illustrative embodiment of the invention, the contractor 42 will lift or move off that surface and move forwardly until it strikes the annular shoulder 100. At this time, the cam surface 62 will expand to release the gripping surface 48, and further forward motion of the actuator 40 and contractor 42 will effect a forward motion of the collet wherein the front gripping surface 46 will be expanded so as to release its gripping action on shank section S-1, as will be evident.

It will thus be seen that the object of this invention have been fully and effectively accomplished. It will be realized, however, that the foregoing specific embodiments have been shown and described only for the purpose of illustrating the principles of the invention and are subject to extensive change without departure from such principles. Therefore, this invention includes all modifications encompassed within the spirit and scope of the following claims.

We claim:

1. A collet for gripping the shank of a shank pinion at two axially spaced regions, said collet comprising: a tubular body having first and second axially spaced internal gripping surfaces; means providing an external centering means disposed intermediate the ends of said body; and first and second external cam surface means provided on said body outwardly of said first and second internal gripping surfaces, respectively; said first cam surface means projecting radially outwardly from said body a greater distance than said second cam surface means, and said external centering means also projecting radially outwardly from said body a lesser distance than said first cam surface means and a greater distance than said second cam surface means.

2. The collet defined in claim 1 wherein said centering means includes an annular projection on said body, intermediate said first and second external cam surface means.

3. The collet defined in claim 1 wherein said tubular body is provided with two sets of axial slots extending from each end of said body inwardly toward said centering means, and further wherein the slots of one set are circumferentially staggered relative to the slots of the other set.

4. A chuck for shank pinions, said chuck comprising a collet and a tubular body, an actuator means slidable axially in said body, said collet being of rigid one-piece, unitary construction and slidably arranged in said body forwardly of said actuator means, two external cam surface means being provided on said collet at axially spaced regions thereon, internal cam surface means being provided in said body and on said actuator means and adapted for camming engagement with said external cam surface means, and external centering means being provided on said collet in slidable engagement with said tubular body and intermediate said external cam surface means.

5. The chuck defined in claim 4 wherein two sets of axially extending slots are provided in said collet, one of said sets of slots being disposed entirely on one side of said centering means and the other of said slots being disposed entirely on the other side of said centering means.

6. The chuck defined in claim 4 wherein said external cam surface means are provided on the collet adjacent the front and rear thereof, and means for releasably engaging said collet to said actuator means.

7. The collet defined in claim 6 wherein said means for releasably engaging said collet to said actuator means includes the rear cam surface means on said collet and the cam surface means on said actuator, both of said last-named surface means being defined by spaced, radial projections and recesses between said projections constructed and arranged to provide a bayonet-type joint.

8. The chuck defined in claim 4 wherein said centering means is in the form of an annular collar on said collet.